March 19, 1935. B. A. ROSE 1,994,922
TURBINE GENERATOR ROTOR
Filed July 29, 1932
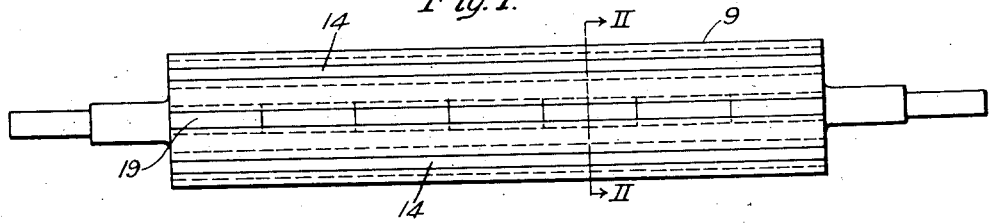
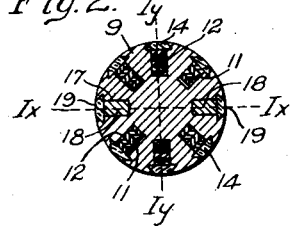
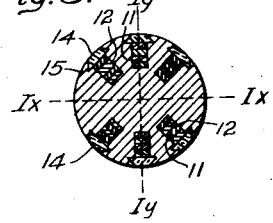
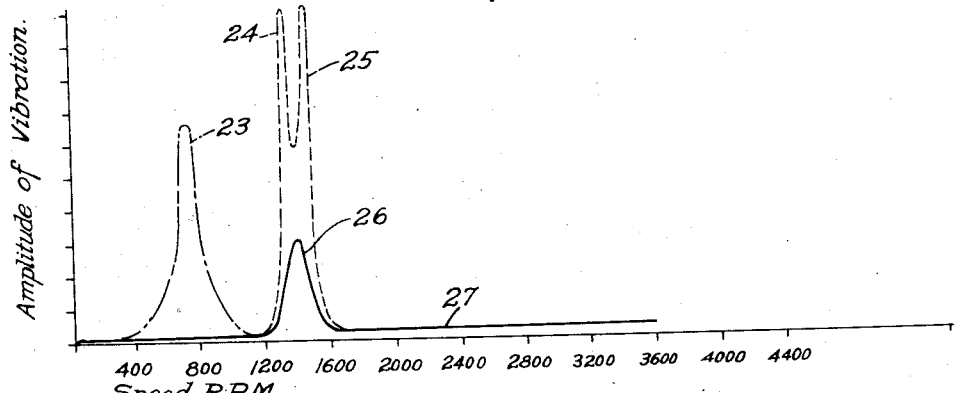
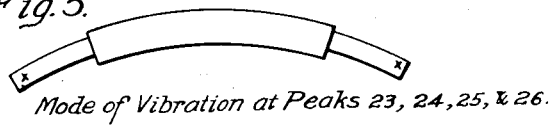
Mode of Vibration at Peaks 23, 24, 25, & 26.
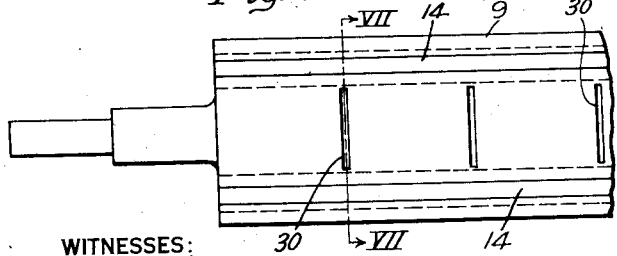
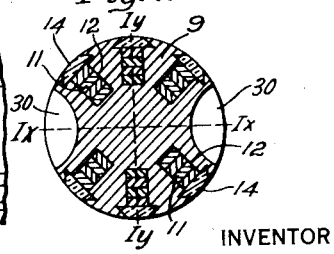
INVENTOR
Bennie A. Rose.
BY W. R. Coley
ATTORNEY
WITNESSES:

Patented Mar. 19, 1935

1,994,922

UNITED STATES PATENT OFFICE 1,994,922

TURBINE GENERATOR ROTOR

Bennie A. Rose, Swissvale, Pa., assignor to Westinghouse Electric & Manufacturing Company, East Pittsburgh, Pa., a corporation of Pennsylvania Application July 29, 1932, Serial No. 625,613

7 Claims. (Cl. 171—206)

My invention relates, in general, to turbine generators and more particularly to two-pole, high-speed, turbine generators of large capacities.

With the increasing demand for two-pole turbine generators of large capacity to operate at a speed of 3600 R. P. M., for example, the problem of designing a rotor which will operate satisfactorily and be substantially free from vibration is of major importance. On acount of the high rotative and peripheral speeds, the general design of a two-pole turbine generator of large capacity depends upon the type and construction of the rotor rather than upon the construction of the stator. The stresses in a rotor of this type, caused by the centrifugal forces of the various rotating parts, are so great that the diameter of the rotor cannot safely exceed 30 inches without there being such a corresponding reduction in the weight of the copper field windings that the k. v. a. rating of the turbine generator is accordingly reduced. Consequently, little is gained by attempting to make the diameter of a two-pole rotor larger than approximately 30 inches. In other words, the relationship between the rotating stresses and the diameter of a two-pole rotor shows that the maximum k. v. a. rating of a two-pole turbine generator is obtained when the diameter of the rotor is approximately 30 inches. Furthermore, the utilization of aluminum exciting coils, while lighter in weight, is objectionable, for the reason that a larger cross-sectional area of the aluminum is required to obtain the same k. v. a. rating as the copper exciting coils. Therefore, the only means of materially increasing the k. v. a. rating of the relatively large two-pole turbine generators is to lengthen the body of the rotor.

Accordingly, it is the increased length of the body of a two-pole rotor that leads to two serious modes of vibration. The rotor of a two-pole turbine generator having a capacity of 35000 k. v. a. is approximately 170 inches long with a diameter of 30 inches. When the ratio of the length to the diameter of the rotor approaches or exceeds 5 to 1 the body becomes quite flexible. This means that, as a result of its own weight, the body of the rotor is caused to sag or deflect downwardly, thus causing a relatively large downward curvature in the body. This large curvature in the body of the rotor, in combination with the variable moment of inertia of an area at right angles to the rotor body that is caused by the non-uniformly disposed radial coil slots, causes two very serious modes of vibration to occur as the rotor is brought up to normal operating speed or as it is allowed to slow down to a standstill. One of these serious modes of vibration takes place in a frequency range that substantially coincides with the frequency range of a main critical speed of the entire turbine generator, said speed being a speed at which the frequency of the disturbing force is in resonance with the natural frequency of vibration of the entire generator. The other serious mode of vibration takes place at a frequency which is substantially one-half of the main critical speed.

The moment of inertia under consideration in this case is that of a plane area, namely, $$I = \int r^2 dA,$$

where I is the moment of inertia, r is the distance of each small area, dA, from the axis under consideration. In this case only a section at right angles to the axis of the rotor need be considered, as will become apparent from the more detailed disclosure given hereinafter. "The moment of inertia of a section is the sum of the products of each elementary area of the section into the square of its distance from an assumed axis of rotation, as the neutral axis". See Kent's Mechanical Engineers' Pocket-Book, page 247, fourth edition, revised. See also Strength of Materials by Boyd, third edition, revised 1924, page 589.

The latter of these modes of vibrations is the result of the action of the body of the rotor itself in resisting the downward pull of gravity. Inasmuch as the coil slots are non-uniformly disposed around the periphery of the rotor to form the two field poles, the rigidity of the body of the rotor is not constant in all radial directions in a plane perpendicular to the rotational axis. The non-uniformly disposed coil slots about the periphery of the body of the rotor cause two principal moments of inertia to exist in the body of the rotor, which may be generally referred to with regard to axis $I_x$—$I_x$ and $I_y$—$I_y$. With the presence of the two principal moments of inertia, the rotor under the influence of gravity is caused to deflect up-and-down twice upon each revolution of the rotor. Accordingly, the frequency resulting from the variable moment of inertia is exactly twice the frequency of the speed of rotation. Therefore, when the speed of rotation is exactly one-half the main critical speed, the disturbing influence of the variable moment of inertia has a frequency equal to the main critical speed. At this particular speed a condition of resonance is present, and, consequently, a serious mode of vibration occurs, which, if not reduced, to a safe value, will eventually wreck the rotor.

The second serious mode of vibration occurs in a speed range between the two first ordinary critical speeds. In general, a rotating shaft does not have two first critical speeds, but, by reason of the fact that a two-pole rotor is non-uniformly slotted around the periphery, it has two first critical speeds each resulting from the two different moments of inertia in the body of the rotor. If the moment of inertia about the axis $I_x$—$I_x$ is less than that about the axis $I_y$—$I_y$ the critical speed corresponding to the first will be less than that corresponding to the second. Because of this variable moment of inertia, the body of two pole rotor will not behave as a simple shaft, but will vibrate seriously throughout the entire range between the two critical speeds corresponding to the two moments of inertia, even to the extent of totally wrecking the rotor. However, when the speed of the rotor is increased beyond the speed range occurring between the two critical speeds corresponding to the two moments of inertia, the rotor is no longer influenced by the variable moment of inertia. That is to say, when the rotor is operating at a relatively high speed the vibrating motion is not the same as it is when operating near or at the critical speeds. A simple shaft slightly unbalanced, but having a uniform flexural rigidity in all radial directions, vibrates only at one certain speed, being in the range near the first critical speed. However, with the damping influences, which are always present, this mode of vibration is not generally considered serious, because the magnitude of the vibration is limited to a certain finite value. This finite value, as is known in the art, is determined when a state of equilibrium is reached between the energy that is put into the system and that absorbed by the damping of the rotating body.

The two-pole rotor with a variable moment of inertia acts entirely different from a simple shaft. It is shown analytically by Dr. A. Stodola (see Steam & Gas Turbines, vol. 2, Page 1125 written by Dr. Stodola and published by McGraw-Hill Book Company, Inc. in 1927) that the motion of a rotating body through the speed range between the first two critical speeds is unstable. That is to say, the amplitude of vibration steadily increases to such large proportions that eventually the rotor will wreck itself. It is apparent, however, that this tendency towards instability is not present to any appreciable extent in two-pole rotors for relatively small turbine generators where the ratio of the length to the diameter of the rotor is relatively small. In other words, where the ratio of the length to the diameter of a rotor is relatively small the damping, which is always present in a rotating body, limits the vibrations to correspondingly small amplitudes. However, in long flexible rotors, as are used in large generators of the two-pole type, the damping action is not sufficient to limit the vibrations to small safe values, and, accordingly, these vibrations become alarmingly great.

Tests conducted on models of a two-pole rotor, dynamically similar to large rotors, show that if the speed of rotation were maintained in the speed range between the two critical speeds corresponding to the two moments of inertia, the vibrations would continue to increase to such large proportions that the rotor would eventually wreck itself.

The principal object of my invention is to provide for eliminating the two critical modes of vibration caused by a variable moment of inertia in a plane perpendicular to the rotational axis.

The secondary object of my invention is to provide for so constructing a two-pole rotor for a turbine generator that the moment of inertia is substantially equal in all radial directions, whereby the modes of vibrations, as hereinabove discussed, are entirely eliminated or reduced to such small values that the rotor may be efficiently operated throughout the critical speed ranges.

Other objects and a full understanding of my invention may be had by referring to the following description, taken in connection with the accompanying drawing, in which;

Figure 1 is a longitudinal view of a two-pole rotor embodying the features of my invention.

Fig. 2 is a cross-sectional view taken along the line II—II of Fig. 1.

Fig. 3 is a cross-sectional view of a two-pole rotor showing only the radial coil slots.

Fig. 4 illustrates the resonant curves for the mode of vibrations resulting from a variable moment of inertia.

Fig. 5 is a diagrammatic, but an exaggerated, view of the mode of vibration which exists when a resonant condition of vibration occurs.

Fig. 6 is a fragmentary longitudinal view of a two-pole rotor embodying a modified form of my invention, and Fig. 7 is a cross-sectional view taken along the line VII—VII of Fig. 6.

With reference to the drawing, the reference character 9 represents, generally, a two-pole rotor for a high-speed turbine generator. As usually constructed for high speed machines the body and the shafts are forged from one piece. However, the rotor may be built up of a number of separate plates or disks mounted rigidly together to form a unitary structure.

With particular reference to Figs. 2 and 3, the reference character 12 represents the usual coil slots in which the current carrying conductors 11 are secured. As illustrated, in accordance with the general practice, the current carrying conductors 11 may be held in place by non-magnetic wedges 14 which are inserted or driven into longitudinal grooves provided in the sides of the coil slots near the outer periphery of the rotor. Up to this point, the rotor thus far described is of the conventional type that is generally used for turbine generators of relatively small capacities. As is readily apparent, in the conventional type, the moment of inertia about the horizontal axis $I_x$—$I_x$ is less than the moment of inertia about the vertical axis $I_y$—$I_y$.

In order to totally eliminate or to reduce to safe limits the vibrations resulting from the variable moments of inertia, I preferably provide for milling in the pole sectors of the rotor, additional slots 17. The arcuate spacing, the depth, and other dimensions of these additional slots 17 are the same as the coil slots 12. This provision, as is manifest, reduces the moment of inertia about the vertical axis and the total result is such that the moment of inertia in all radial directions is substantially the same. Hence, the modes of vibration resulting from a variable moment of inertia are totally or substantially eliminated.

As illustrated, in order not to increase the reluctance of the magnetic path of the poles, the additional slots 17 are refilled by bars 18 of para-magnetic material. The para-magnetic bars 18 are cut in relatively short sections, so that they do not add any additional rigidity to the rotor, and thus disturb the substantially constant flexural rigidity. The bars 18 may be secured in the slots 17 by means of para-magnetic wedges 19 driven into longitudinal grooves that are provided in the sides of the additional slots 17 near the outer periphery of the rotor. The bars 18 and the wedges 19 may be of a higher permeability than the steel forging of the rotor itself. Accordingly, the magnetic reluctance of the poles is not reduced in any manner by milling in the additional slots 17.

Lest there be some misunderstanding of the theory of my invention, it should be remembered that the rotor is equivalent to a loaded beam subject to rotation. Obviously, if a beam is considered to have a section such as indicated in Fig. 3, its flexural rigidity about a neutral axis such as $I_x$—$I_x$ is a function of the moment of inertia about this axis and the modulus of elasticity of the material of the beam. Further, its flexural rigidity about $I_y$—$I_y$ when this axis is in the horizontal position, namely, the neutral axis, is also determined by the moment of inertia of the plane area of the section of the beam about the axis $I_y$—$I_y$ and the modulus of elasticity of the material of the beam. A rotor or beam such as shown in Fig. 3, when loaded by its own weight and subject to rotation, will thus have a variable flexural rigidity because the moment of inertia about its horizontal or neutral axis varies.

If the structure be of the nature shown in Fig. 2, and the bars 18 are relatively short bars, their influence even though of the self-same material as the rotor body will be negligible and the sectional area of the bars 18 need not be taken into consideration in determining the moment of inertia about any neutral axis. The material in the slot 17 thus has no more influence on the flexural rigidity of the rotor 9 than have the conductors in the slots for the two poles.

With regard to the showing in Figs. 6 and 7, a similar theory obtains because slots 30, being spaced relatively short distances apart obviously substantially eliminate that portion of the material of the rotor intermediate the slots 30 from consideration when determining the moment of inertia about the neutral axis. The rotor shown in Figs. 6 and 7 thus also has a uniform flexural rigidity, because the moment of inertia about the neutral axis has substantially no variation.

The vibrating characteristics of a two-pole rotor may be best understood by referring to the resonant curves of Fig. 4, in which the amplitude of vibration of the body of the rotor is plotted as ordinates and the speed of rotation as abscissæ.

The first peak from the left, indicated by the reference character 23, illustrates, generally, the magnitude of vibration of the first critical speed resulting from a variable moment of inertia. The mode of vibration represented by the peak 23 results from only the variable moment of inertia, and has no connection with the unbalanced condition of the rotor. The peak 23 occurs at a speed equal to one-half the first main critical speed. Hence, in accordance with my invention, the vibrations represented by the peak 23 are totally or substantially eliminated when the additional slots 17 are provided in the pole sectors of the rotor.

The resonant peaks, represented by the reference characters 24 and 25, show, generally, the amplitude of vibration at the two critical speeds resulting from a non-uniform moment of inertia. The peak 24 corresponds to one moment of inertia say about $I_x$—$I_x$, and the peak 25 corresponds to the other moment of inertia, say about axis $I_y$—$I_y$. The peak 25 occurs at a slightly higher speed than the peak 24, for the reason that the moment of inertia about $I_y$—$I_y$ is greater than the moment of inertia $I_x$—$I_x$. Should the rotor be allowed to run for even a relatively short period of time in the speed range between the peaks 24 and 25, the vibrations would eventually build up to such large proportions that the rotor would soon wreck itself. The seriousness of this mode of vibration is substantiated analytically by Stodola (see the publication hereinbefore mentioned). The peak, designated by the reference character 26, shows, generally, the amplitude of the vibration occurring at the first main critical speed of a two-pole rotor embodying the features of my invention. The maximum amplitude of the peak 26 is such that it is always within the safe operating limits of the rotor. Therefore, the vibrating characteristics of a two pole rotor embodying the features of my invention is represented, generally, by the heavy line 27, the peak 26 being the only one occurring as the speed of the rotor is brought up to the normal operating speed, or as the rotor is allowed to slow down to a standstill.

In Figs. 6 and 7, I illustrate a modified form of my invention. In the modified form, I provide for cutting, at spaced intervals, radial arcuate slots 30 in the pole sectors of the rotor. The spacing and the depth of the radial slots 30 will, in a measure, depend upon the length of the body of the rotor, but in any event, a sufficient number of slots are provided so that the flexural rigidity of the rotor is substantially constant in all radial directions.

Since certain changes in my invention may be made without departing from the spirit and scope thereof, it is intended that all matters contained in the foregoing description and shown in the accompanying drawing shall be interpreted as illustrative and not in a limiting sense.

I claim as my invention:

1. A two-pole rotor having two groups of coil slots formed therein, current-carrying conductors disposed in said coil slots, said rotor having additional slots formed therein to provide a substantially constant flexural rigidity, and magnetic material disposed in said additional slots.

2. A two-pole rotor having two groups of coil slots formed therein, current-carrying conductors disposed in said coil slots, said coil slots having grooves formed in their sides near the outer periphery of the rotor, wedges of non-magnetic material inserted in said grooves for securing the current-carrying conductors in said coil slots, said rotor having additional slots formed therein to provide a substantially constant flexural rigidity, magnetic material disposed in said additional slots, said additional slots having grooves formed in their sides near the outer periphery of the rotor, and wedges inserted in the last-mentioned grooves for securing the magnetic material in said additional slots.

3. A two-pole rotor having two groups of coil slots formed therein, current-carrying conductors disposed in said coil slots, said coil slots having grooves formed in their sides near the outer periphery of the rotor, wedges of non-magnetic material inserted in said grooves for securing the current-carrying conductors in said coil slots, said rotor having additional slots formed therein to provide a substantially constant flexural rigidity, magnetic material disposed in said additional slots, said additional slots having grooves formed in their sides near the outer periphery of the rotor, and wedges of magnetic material inserted in the last-mentioned grooves for securing the magnetic material in said additional slots.

4. A two-pole rotor having two groups of coil slots formed therein, current-carrying conductors disposed in said coil slots, said coil slots having grooves formed in their sides near the outer periphery of the rotor, wedges of non-magnetic material inserted in said grooves for securing the current-carrying conductors in said coil slots, said rotor having additional slots formed therein to provide a substantially constant flexural rigidity, bars of magnetic material disposed in said additional slots, said bars being cut in sections to avoid disturbing the substantially constant flexural rigidity of the rotor, said additional slots having grooves formed in their sides near the outer periphery of the rotor, and wedges inserted in the last-mentioned grooves for securing the magnetic material in said additional slots.

5. A rotor of the slotted type having two poles, said poles being provided with a plurality of slots but each of said poles having at least one of said slots formed therein to reduce the flexural rigidity of the rotor, bars of magnetic material disposed in the slot formed to reduce the flexural rigidity, said bars being cut in sections to avoid re-strengthening the rotor, and means for securing the magnetic bars in the slot provided with said bars.

6. A rotor of the slotted type having two poles and two groups of coil slots, and current-carrying conductors disposed in said coil slots, said poles having additional slots formed therein at the regions not slotted for said current-carrying conductors to provide a substantially constant flexural rigidity.

7. A rotor of the slotted type having two poles and two groups of coil slots, and current-carrying conductors disposed in said coil slots, said poles having transverse slots formed therein and positioned only in the regions not slotted for said current-carrying conductors to provide a substantially constant flexural rigidity.

BENNIE A. ROSE.